(12) United States Patent
Pelzer et al.

(10) Patent No.: US 12,437,506 B2
(45) Date of Patent: Oct. 7, 2025

(54) IMAGE ANNOTATION SYSTEM AND METHOD

(71) Applicant: LEICA MICROSYSTEMS CMS GMBH, Wetzlar (DE)

(72) Inventors: Patric Pelzer, Wetzlar (DE); Markus Ott, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 393 days.

(21) Appl. No.: 18/065,705

(22) Filed: Dec. 14, 2022

(65) Prior Publication Data
US 2023/0196725 A1 Jun. 22, 2023

(30) Foreign Application Priority Data
Dec. 21, 2021 (EP) ..................................... 21216273

(51) Int. Cl.
*G06V 10/74* (2022.01)
*G06F 3/04812* (2022.01)
(Continued)

(52) U.S. Cl.
CPC ........ *G06V 10/761* (2022.01); *G06F 3/04812* (2013.01); *G06F 3/04883* (2013.01);
(Continued)

(58) Field of Classification Search
CPC .... G06F 3/048; G06F 3/0481; G06F 3/04812; G06F 3/0484; G06F 3/04845; G06F 3/0487; G06F 3/04883; G06F 3/04892; G06F 3/04897; G06F 3/038; G06F 3/14; G06F 3/1407; G06F 3/1423; G06T 7/0012; G06T 7/10; G06T 7/11;
(Continued)

(56) References Cited

U.S. PATENT DOCUMENTS 7,072,501 B2 * 7/2006 Wood ...................... G06T 15/08
715/700
2010/0290693 A1 * 11/2010 Cohen .................. A61B 5/0044
382/134

(Continued)

FOREIGN PATENT DOCUMENTS

WO WO 2014/089499 A1 6/2014

*Primary Examiner* — Oneal R Mistry
*Assistant Examiner* — Duy Tran
(74) *Attorney, Agent, or Firm* — LEYDIG, VOIT & MAYER, LTD.

(57) ABSTRACT

An image annotation system for annotating a microscopic image of a sample includes an output unit configured to display the image of the sample, and an input unit configured to capture a first and second user input sequence including a first and second movement of a cursor over the image, the first and second movement defining a first and second closed path. The image annotation system also includes a processor configured to determine a first image area, determine whether the second closed path includes at least one proximity section, when the second closed path does not include the proximity section, to determine a second image area, and when the second closed path does include the proximity section, to determine the second image area and at least one area between the border of the first image area and the at least one proximity section.

13 Claims, 5 Drawing Sheets

(51) Int. Cl.
- *G06F 3/04883* (2022.01)
- *G06F 3/14* (2006.01)
- *G06T 7/00* (2017.01)
- *G06V 10/25* (2022.01)

(52) U.S. Cl.
CPC .............. *G06F 3/14* (2013.01); *G06T 7/0012* (2013.01); *G06V 10/25* (2022.01); *G06T 2207/10056* (2013.01)

(58) Field of Classification Search
CPC . G06T 2207/10056; G06T 2207/10132; G06T 2207/20112; G06T 2219/004; G06T 11/80; G06V 10/774; G06V 10/764; G06V 10/761; G06V 20/70; G06V 10/25; G06V 10/20; G06V 10/23; G06V 10/235; G16H 30/00; G16H 30/20; G16H 30/40; G16H 40/60; G16H 40/63
See application file for complete search history.

(56) References Cited

U.S. PATENT DOCUMENTS

| | | | |
|---|---|---|---|
| 2011/0131535 A1* | 6/2011 | Tagami | G06T 1/00 715/838 |
| 2011/0249910 A1* | 10/2011 | Henderson | G06V 10/993 382/278 |
| 2015/0089337 A1 | 3/2015 | Grady et al. | |
| 2015/0220240 A1* | 8/2015 | Tsukijishin | G06F 3/04847 715/773 |
| 2019/0137743 A1* | 5/2019 | Schumann | G02B 21/0072 |
| 2019/0347524 A1* | 11/2019 | Znamenskiy | G06V 30/19167 |

* cited by examiner

IMAGE ANNOTATION SYSTEM AND METHOD

CROSS-REFERENCE TO PRIOR APPLICATION

This application claims benefit to European Patent Application No. EP 21216273.9, filed on Dec. 21, 2021, which is hereby incorporated by reference herein.

FIELD

The invention relates to an image annotation system for annotating a microscopic image of a sample. The invention further relates to a method for determining at least one image area in a microscopic image of a sample based on a user input.

BACKGROUND

In order to process large amounts of images gathered by a microscope, machine learning algorithms are used. When properly trained, these machine learning algorithms can autonomously classify, that is identify and label, objects within the microscopic images. A set of annotated images called the training dataset is used for training. This training dataset provides examples of what the machine learning algorithm should reproduce. Depending on the task, the examples comprise single pixel and/or the outline of a full object that needs to be classified by the machine learning algorithm. The outline of the full object allows the machine learning algorithm to understand the larger context. For example, if the object to be classified is a circular object with only a bright edge, then it is difficult to correctly identify a dim signal in the middle of the object. Further, outlining the full object allows the machine learning algorithm to understand the concept of a circle and inside/outside, so it has a chance to classify the whole object properly.

The examples in the training data set may need to be provided by the user. In order to efficiently generate a training data set, the user needs an image annotation system. For example, a visual interface may be used that allows the user to label individual pixels in a microscopic image by means of image processing tools, in particular, a visual interface that allows the user to draw labels on top of the microscopic image.

SUMMARY

In an embodiment, the present disclosure provides an image annotation system for annotating a microscopic image of a sample. The image annotation system includes an output unit configured to display the image of the sample, and an input unit configured to capture a first user input sequence including a first movement of a cursor over the displayed image, the first movement defining a first closed path, and to capture at least one second user input sequence including a second movement of the cursor over the displayed image, the second movement defining a second closed path. The image annotation system also includes a processor configured to determine a first image area of the image of the sample corresponding to an area of the displayed image enclosed by the first closed path, determine whether the second closed path includes at least one proximity section where the second closed path is close to a border of the first image area based on at least one proximity condition, based on the second closed path not comprising the at least one proximity section, to determine a second image area of the image of the sample corresponding to an area of the displayed image enclosed by the second closed path, and based on the second closed path comprising the at least one proximity section, to determine the second image area corresponding to the area of the displayed image enclosed by the second closed path and corresponding to at least one area of the displayed image between the border of the first image area and the at least one proximity section.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Embodiments of the present invention provide an image annotation system and a method that allows a user to annotate a microscopic image in a fast and easy way.

An embodiment of the proposed image annotation system for annotating a microscopic image of a sample comprises an output unit configured to display the image of the sample, and an input unit configured to capture a first user input sequence comprising a first movement of a cursor over the displayed image, the first movement defining a first closed path, and to capture at least one second user input sequence comprising a second movement of the cursor over the displayed image, the second movement defining a second closed path. The image annotation system further comprises a processor. The processor is configured to determine a first image area of the image of the sample corresponding to an area of the displayed image enclosed by the first closed path, to determine whether the second path comprises at least one proximity section where the second path is close to a border of the first image area based on at least one proximity condition, and when the second path does not comprise the proximity section, to determine a second image area of the image of the sample corresponding to an area of the displayed image enclosed by the second closed path, and when the second path does comprise the proximity section, to determine the second image area corresponding to the area of the displayed image enclosed by the second closed path and corresponding to at least one area of the displayed image between the border of the first image area and the at least one proximity section.

The microscopic image can be annotated by assigning the first and second image areas to different regions of the microscopic image. Each of the image areas may correspond to a different object or region of the sample. The first image area can be generated by defining the first closed path, i.e.

by moving the cursor over the displayed image around a region of the displayed image that the user wants to define as the first image area. The second image area can also be defined by moving the cursor over the displayed image around a region that the user wants to define as the second image area, i.e. by drawing the second closed path. However, when the second closed path comprises a section that is close to the border of the first image area, which herein is defined as a proximity section, the image annotation system automatically adds the region of the microscopic image that is located between the first image area and the proximity section of the second path to the second image area. Thereby, the user does not need to be very precise when defining image areas that border each other, for example, when defining image areas in order to annotate different objects or regions of the sample which touch each other. In other words: by allowing the user to coarsely define the second image area and filling in the gaps, the image annotation system supports the user, and thus allows them to work more quickly and efficiently. Thereby, the image annotation system provides a user with a fast and easy to use smart tool for annotating the microscopic image, for example in order to generate a training data set for a machine learning algorithm.

In a preferred embodiment, the processor is configured to determine whether the second path comprises the at least one proximity section by performing the following steps: determining a distance for each image point on the second closed path between the image point on the second closed path and an image point on the border of the first image area that is closest to the image point on the second closed path, comparing each distance to a threshold value, and, when at least a predetermined number of distances are smaller than the threshold value, determining that the second path comprises the at least one proximity section. The processor is further configured to determine the at least one proximity section based on the image points for which the distance is smaller than the threshold value. In a preferred embodiment, the threshold value is determined based on a user input and/or a zoom level of the displayed image. In another embodiment, if the zoom level is high, i.e. if the displayed image is enlarged, the threshold value is lower. This allows the user to zoom into the displayed image in order to define the second image area more precisely. Alternatively, or additionally, the processor may be configured to determine the threshold value based on an image content of the microscopic image.

In another preferred embodiment the processor is configured to re-determine the second image area to exclude an area of the displayed image where the first and second image areas overlap. In this embodiment, the user can draw over the first image area when drawing the second closed path. The image annotation system automatically only adds parts of the displayed image that are not already defined as an image region to the second image region. This allows the user to work even more quickly.

In another preferred embodiment, the first and second user input sequences comprise a button press and a button release, and a section of the first or second closed path, respectively, is defined by a movement of the cursor between the button press and the button release. Using a button press/release as a way of determining the beginning and end of the first and second movements is very intuitive. This allows the user to select the first and second image areas very fast, allowing a high through put.

In another preferred embodiment, the first and second user input sequences comprise a selection of at least two image points of the displayed image, and a section of the first or second closed path, respectively, is defined by a line between the two selected image points. In this embodiment, the user can define a straight line by selecting the two image points. This further speeds up the annotation process, thereby allowing the user to work more efficiently.

In another preferred embodiment, the processor is configured to generate an object map comprising image points, each image point corresponding to an image point of the image of the sample. Each image point of the object map encodes the information which image area the corresponding image point of the image of the sample belongs to. The object map is distinct from the microscopic image and can be used to generate a training data set for a machine learning algorithm.

In another preferred embodiment, the input unit is a computer mouse. In this embodiment, the processor is configured to determine the first and second movements of the cursor based on a movement of the computer mouse. Alternatively, other input units such as a joystick or a track ball may be used. In particular, the image annotation system is setup up such that many different input devices may be used. Thereby, the user may select the input device they are most comfortable with ensuring an intuitive and fast use of the image annotation system.

In another preferred embodiment, the image annotation system comprises a touchscreen forming the output unit and/or the input unit. Preferably, the processor is configured to determine the beginning of the first and second movements by determining that an object is touching the touchscreen, and to determine the end of the first and second movements by determining that the object is no longer touching the touchscreen. The processor is configured to determine the first and second movements of the cursor based on a movement of the object over the touchscreen. The object may be a finger of the user, a pen or a stylus. Using a touchscreen, in particular in combination with a pen or stylus, is very intuitive since it mimics the use of pen and paper. This allows the user to quickly annotate the microscopic image.

In another preferred embodiment, the image annotation system comprises a virtual reality and/or an augmented reality interface that is configured to provide the input unit and/or the output unit. Virtual and augmented reality provide an intuitive way of interacting with the image annotation system.

In another preferred embodiment, the processor is configured to determine whether the second path comprises the at least one proximity section during an input of the second input sequence. In this embodiment, the image annotation system can provide the user with instant feedback on whether or not the second path comprises the proximity section. This gives the user more control over the definition of the second image area, thereby making the image annotation system easier to use.

In another preferred embodiment, the output unit is configured to display the first and second image areas. Thereby, the image annotation system provides the user with feedback with regards to the first and second user input sequences defining the first and second image areas, respectively. This further increase ease of use.

Embodiments of the present invention also relate to a microscope system comprising an optical detection system configured to capture an image of a sample and an image annotation system as described above.

Embodiments of the present invention also relate to a method for determining at least two image areas in a microscopic image of a sample based on a user input. The method comprises the following steps: displaying the image of the sample, capturing a first user input sequence comprising a first movement of a cursor over the displayed image, the first movement defining a first closed path, capturing at least one second user input sequence comprising a second movement of the cursor over the displayed image, the second movement defining a second closed path, and determining a first image area of the image of the sample corresponding to an area of the displayed image enclosed by the first closed path. When the second path does not comprise the proximity section, determining a second image area of the image of the sample corresponding to an area of the displayed image enclosed by the second closed path. When the second path does comprise the proximity section, determining the second image area corresponding to the area of the displayed image enclosed by the second closed path and corresponding to at least one area of the displayed image between the border of the first image area and the at least one proximity section.

The method has the same advantages as the image annotation system described above. In particular, the method can be supplemented using the features of the image annotation system.

Embodiments of the present invention further relate to a computer program with a program code for performing the method described above when the computer program is run on a processor. The processor may comprise at least one of a CPU (Central Processing Unit), GPU (Graphics Processing Unit), FPGA (Field Programmable Gate Array), ASIC (Application-Specific Integrated Circuit), and DSP (Digital Signal Processor).

The image annotation system is described above mostly in connection with machine learning. However, the use of the image annotation system is not limited to generating image data that can be used as training image data for use with machine learning algorithms. For example, the image annotation system may be used to comment or highlight certain features of the microscopic image for a human observer.

Figure 1:
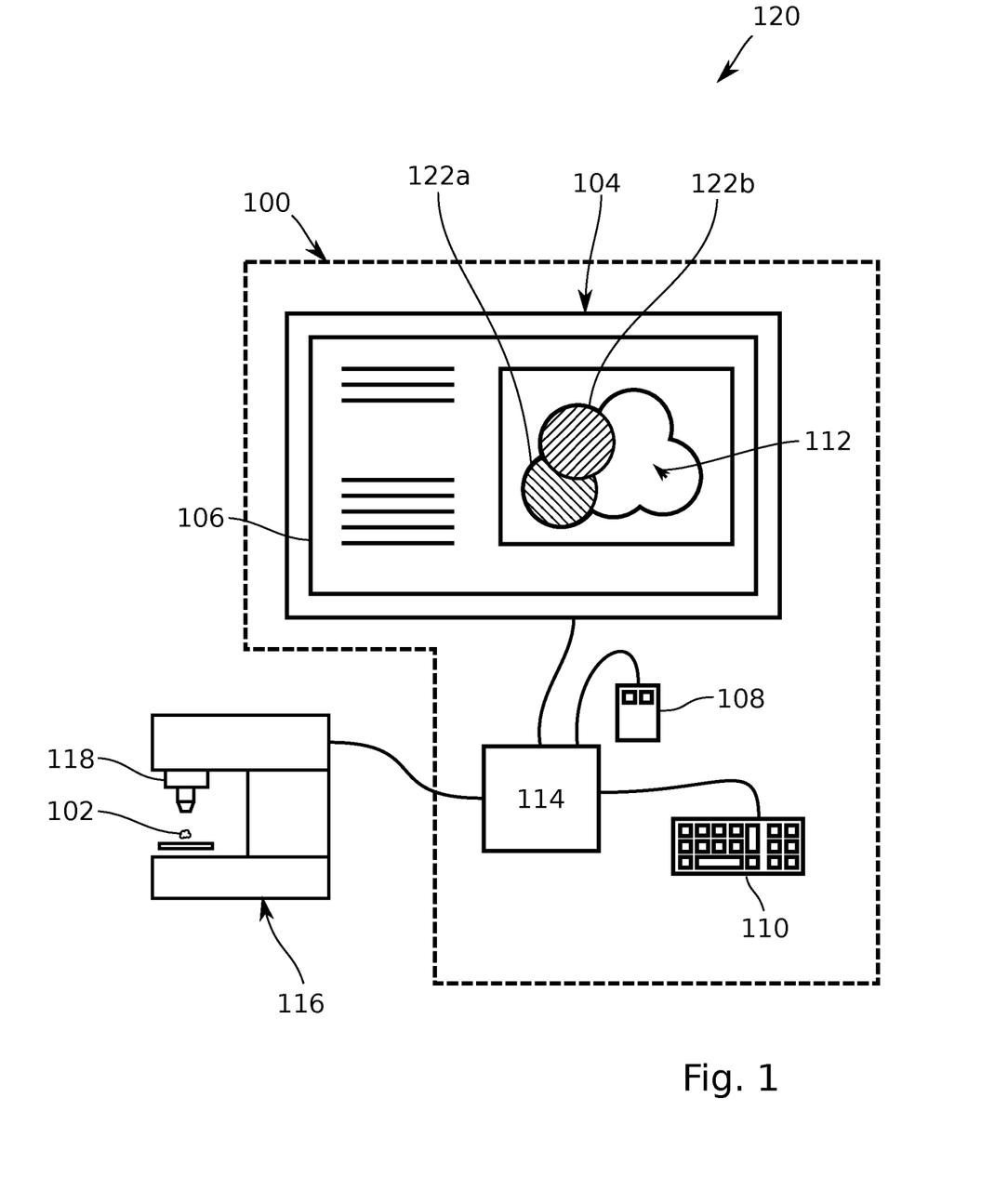
FIG. 1 is a schematic view of an image annotation system for annotating a microscopic image of a sample.

FIG. 1 is a schematic view of an image annotation system 100 for annotating a microscopic image of a sample 102.

In the present embodiment, the image annotation system 100 comprises an output unit 104 which is exemplary formed as a computer monitor having a display area 106, and two input units which are exemplary formed as a computer mouse 108 and a keyboard 110, respectively. The computer mouse 108 is configured to receive a user input and to move a cursor 112 over the display area 106 of the output unit 104. The keyboard 110 is also configured to receive a user input, in particular in the form of a button press/release. The image annotation system 100 further comprises a processor 114 which is connected to the output unit 104 and the input units 108, 110. The processor 114 is further connected to a microscope 116 that has an optical detection system 118 configured to capture the microscopic image of the sample 102. The image annotation system 100 and the microscope 116 may form a microscope system 120.

The processor 114 is configured to receive image data corresponding to the microscopic image of the sample 102 from the microscope 116. The processor 114 may receive the image data for example via a direct connection, a network connection or a data medium. The processor 114 is configured to control the output unit 104 to display the microscopic image of the sample 102 on the display area 106. The processor 114 is also configured to receive control data corresponding to the user input to the two input units 108, 110. Further, the processor 114 is configured to perform a method for determining at least one image area 122a, 122b in the microscopic image of the sample 102 based on an input by a user. The method is described below with reference to FIGS. 2 to 4.

Figure 2:
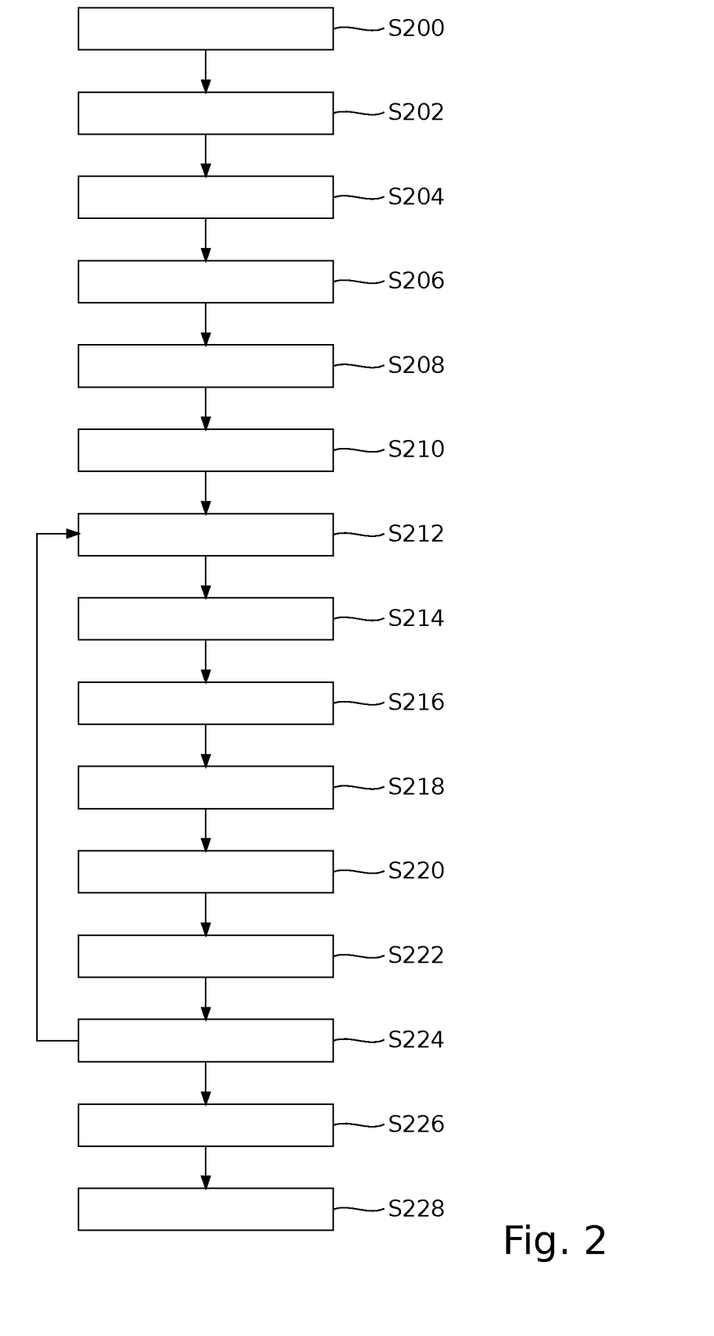
FIG. 2 is a flowchart of a method for determining at least two image areas in a microscopic image of a sample based on a user input.

FIG. 2 is a flowchart of the method for determining the at least two image areas 122a, 122b in the microscopic image of the sample 102 based on the user input.

The process is started in step S200. In an optional step S202 the user determines a zoom level of the microscopic image displayed on the display area 106 of the output unit 104 in order to determine the visible level of detail. In step S204 a button is pressed. This may be a button of the computer mouse 108, in particular a left mouse button, or a button of the keyboard 110. In other embodiments the button press may correspond to an object such as a stylus touching the surface of a touch screen. The button press determines the beginning of a first movement. In step S206 the cursor 112 is moved in the first movement over the microscopic image displayed on the display area 106 of the output unit 104. The first movement may for example be facilitated by a movement of the computer mouse 108 or a movement of the stylus over the touch screen, and determines a first closed path. In step S208 the processor 114 determines the end of the first movement. Steps S204 to S208, in particular how the first closed path is determined, are described in more detail below with reference to FIG. 3. The button press and the first movement of the cursor 112 are a first input sequence. The processor 114 then determines a first image area 122a based on the first closed path in step S210. In a preferred embodiment, the first image area 122a is identical to region of the displayed microscopical image enclosed by the first path. Alternatively, the processor 114 may determine the first image area 122a also based on an image content of the microscopic image. For example, the processor 114 may disregard pixel of the microscopic image having a brightness value below a certain threshold.

In step S212 the button is pressed again. This time, the button press determines the beginning of a second movement. In step S214 the cursor 112 is moved in the second movement over the microscopic image displayed on the display area 106 of the output unit 104. The second movement determines a second closed path. In step S216 the processor 114 determines the end of the first movement. In step S218 the processor 114 determines whether the second closed path comprises at least one proximity section where the second path is close to a border of the first image area. The determination is based on at least one proximity condition. For example, the proximity condition may be whether the distance between image points on the second closed path and a border of the first image area 122a has a value below a predetermined threshold. Step S218 may be performed concurrently to step S214. Steps S212 to S218, in particular the determination of the second closed path and the proximity section, are described in more detail below with reference to FIG. 3.

When the second closed path does not comprise the proximity section, the processor 114 determines a second image area of the image of the sample corresponding to an area of the displayed image enclosed by the second closed path in step S220. When the second path does comprise the proximity section, the processor 114 adds a region of the displayed image located between the border of the first image area 122a and the proximity section to the region enclosed by the second closed path in order to determine the second image area in step S222. In step S224 the processor 114 subtracts any area wherein the first and second image areas 122a, 122b overlap from the second image area 122b.

The steps S212 to S224 may be repeated in order to determine additional image areas 122a, 122b.

In an optional step S226 the processor 114 generates an object map. The object map comprises image points, each image point corresponding to an image point of the image of the sample 102. Each image point of the object map encodes the information which image area 122a, 122b the corresponding image point of the image of the sample 102 belongs to. The object map may be used to generate a training data set for a machine learning algorithm. The process is then ended in step S228.

Figure 3:
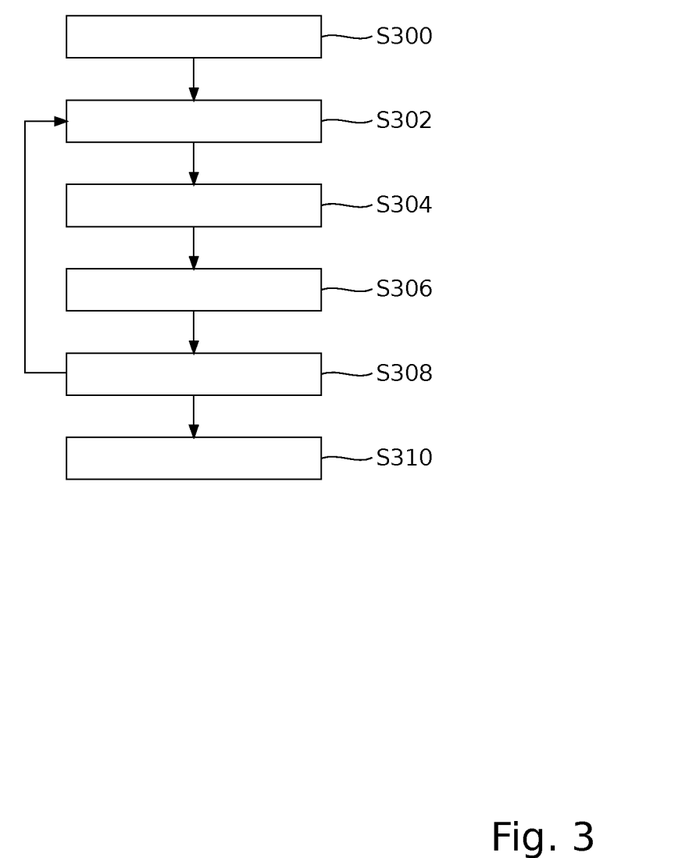
FIG. 3 is a flowchart of an exemplary subprocess for determining a closed path.

FIG. 3 is a flowchart of an exemplary subprocess for determining a closed path.

The subprocess corresponds to the steps S204 to S208 and S212 to S218 described above with reference to FIG. 2, respectively. The subprocess is started in step S300.

In step S302 a button is pressed. The position of the cursor 112 on the displayed image during the button press is saved as a first position. Additionally, the position of the cursor 112 on the displayed image during the first button press of the subprocess is saved as an initial position. In step S304 the button is pressed again. The position of the cursor 112 on the displayed image during the button press in step S304 is saved as a second position. When at least one image area has already been defined, the processor 114 determines a distance between the currently saved first position and the border of the image area, and between the second position and the border of the image area in step S306. When both distances are below a predetermined threshold, the processor 114 determines a line between the first and second positions to be a proximity section. In step S308 the line between the currently saved first and second positions is added to the closed path. The steps S302 to S308 are then repeated until in step S310 a user input is received to stop the subprocess. This user input may for example comprise pressing a different button or a double click. When the subprocess is stopped, a line between the last saved position of the cursor 112 and the initial position of the cursor 112 is added to the closed path.

There are multiple alternative ways of defining a closed path. For example, a closed path or a section of a closed path may be determined by a path the cursor 112 is moved between a button press and a button release.

Figure 4:
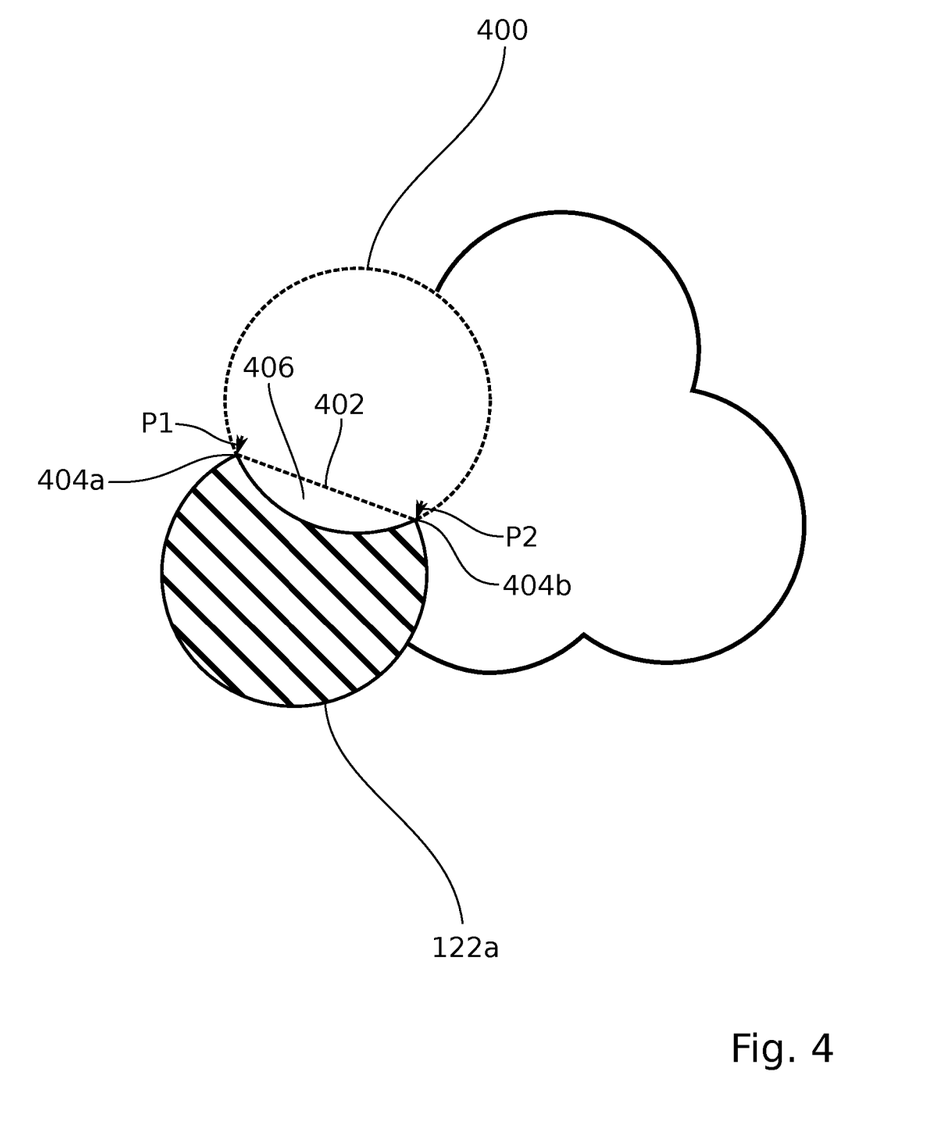
FIG. 4 is a schematic view of a displayed microscopic image, a first image area, and a closed path.

FIG. 4 is a schematic view of the displayed microscopic image, the first image area 122a, and the second closed path 400.

Figure 5:
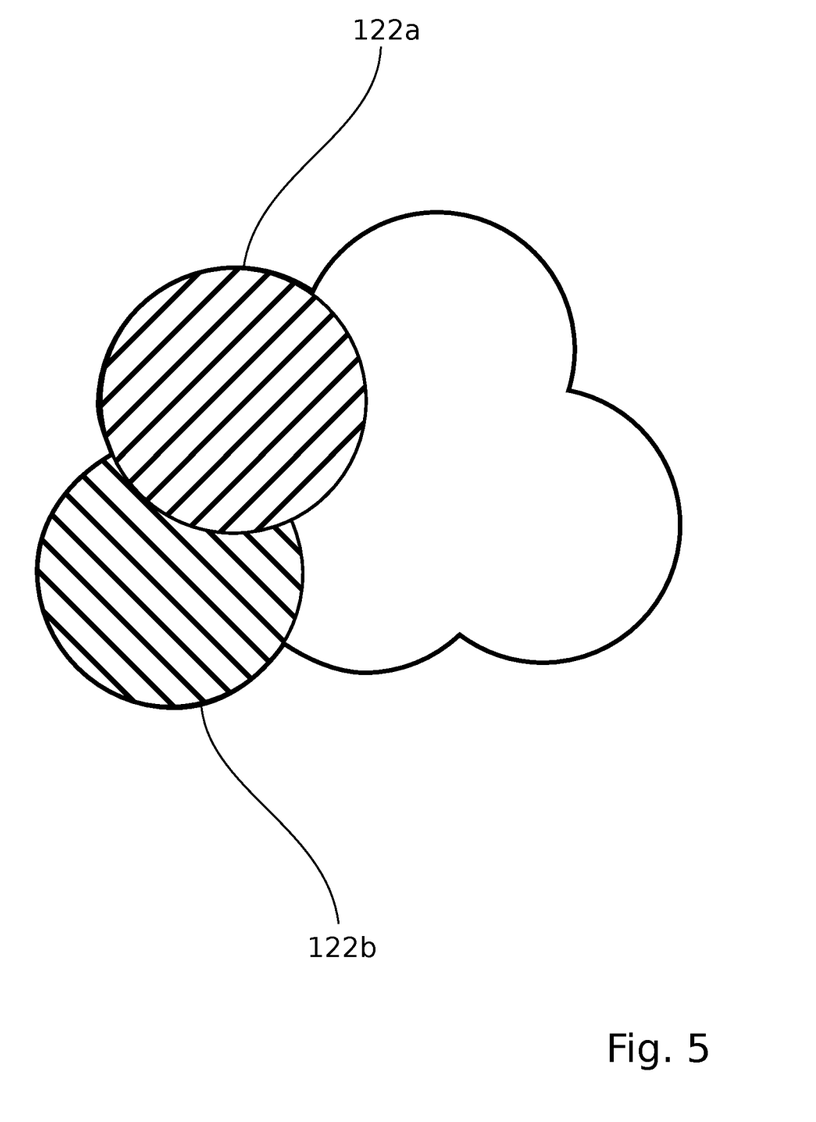
FIG. 5 is a schematic view of the displayed microscopic image, and the image areas.

The second path 400 is shown in FIG. 4 by a dashed line and comprises a section 402 comprising of a line whose end points 404a, 404b are located on the border of the first image area 122a. The end points 404a, 404b have been determined by a button press each, as indicted by two arrows P1, P2 in FIG. 4. In step S306 the processor 114 has determined, that the section 402 is a proximity section. Accordingly, the area 406 between the section 402 and the border of the first image area 122a is added to the second image area 122b. This is shown in FIG. 5 which is a schematic view of the displayed microscopic image, and the first and second image areas 122a, 122b.

Identical or similarly acting elements are designated with the same reference signs in all Figures. As used herein the term "and/or" includes any and all combinations of one or more of the associated listed items and may be abbreviated as "/".

Both the individual features of the embodiments and all combinations of the features among each other are considered disclosed. Furthermore, the individual features of the embodiments are considered disclosed in combination with individual features or feature groups of the preceding description and/or in combination with individual features or feature groups of the claims.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Image annotation system
102 Sample
104 Output unit
106 Display area
108, 110 Input unit
112 Cursor
114 Processor
116 Microscope
118 Optical detection system
120 Microscope system
122a, 122b Image area
400 Path
402 Section
404a, 404b Point
406 Area
P1, P2 Arrow

The invention claimed is:

1. An image annotation system for annotating a microscopic image of a sample, the image annotation system comprising:
   an output unit configured to display the image of the sample;
   an input unit configured to capture a first user input sequence comprising a first movement of a cursor over the displayed image, the first movement defining a first closed path, and to capture at least one second user input sequence comprising a second movement of the cursor over the displayed image, the second movement defining a second closed path; and a processor configured to:
   determine a first image area of the image of the sample corresponding to an area of the displayed image enclosed by the first closed path;
   determine whether the second closed path comprises at least one proximity section where the second closed path is close to a border of the first image area by:
      determining a distance between each respective image point on the second closed path and an image point on the border of the first image area that is closest to the respective image point on the second closed path;
      comparing the distance to a threshold value; and
      based on at least a predetermined number of the distances being less than the threshold value, determining that the second closed path comprises the at least one proximity section;
   based on the second closed path not comprising the at least one proximity section, determine a second image area of the image of the sample corresponding to an area of the displayed image enclosed by the second closed path; and
   based on the second closed path comprising the at least one proximity section, determine the at least one proximity section based on the image points on the second closed path for which the distances are less than the threshold value, determine the second image area corresponding to the area of the displayed image enclosed by the second closed path, and automatically add at least one area of the displayed image between the border of the first image area and the at least one proximity section to the second image area.

2. The image annotation system according to claim 1, wherein the processor is configured to re-determine the second image area to exclude an area of the displayed image where the first and second image areas overlap.

3. The image annotation system according to claim 1, wherein the first and second user input sequences comprise a button press and a button release, and a first section of the first closed path or a second section of the second closed path, respectively, is defined by a third movement of the cursor between the button press and the button release.

4. The image annotation system according to claim 1, wherein the first and second user input sequences comprise a selection of at least two image points of the displayed image, and a first section of the first closed path or a second section of the second closed path, respectively, is defined by a line between the at least two selected image points.

5. The image annotation system according to claim 1, wherein the processor is configured to generate an object map comprising image points, each image point corresponding to an image point of the image of the sample; and wherein each image point of the object map encodes the information of which of the first image area or second image area the corresponding image point of the image of the sample belongs to.

6. The image annotation system according to claim 1, wherein the input unit is a computer mouse; and wherein the processor is configured to determine the first and second movements of the cursor based on a movement of the computer mouse.

7. The image annotation system according to claim 1, comprising a touchscreen forming the output unit and/or the input unit.

8. The image annotation system according to claim 7, wherein the processor is configured to determine a first and second beginning of the first and second movements, respectively, by determining that an object is touching the touchscreen, and to determine a first and second end of the first and second movements, respectively, by determining that the object is no longer touching the touchscreen; and wherein the processor is configured to determine the first and second movements of the cursor based on a movement of the object over the touchscreen.

9. The image annotation system according to claim 1, wherein the processor is configured to determine whether the second closed path comprises the at least one proximity section during an input of the second input sequence.

10. The image annotation system according to claim 1, wherein the output unit is configured to display the first and second image areas.

11. A microscope system comprising:
   an optical detection system configured to capture the image of the sample; and
   the image annotation system according to claim 1.

12. A method for determining at least two image areas in a microscopic image of a sample based on a user input, comprising:
   displaying the image of the sample;
   capturing a first user input sequence comprising a first movement of a cursor over the displayed image, the first movement defining a first closed path;
   capturing at least one second user input sequence comprising a second movement of the cursor over the displayed image, the second movement defining a second closed path;
   determining a first image area of the image of the sample corresponding to an area of the displayed image enclosed by the first closed path;
   determining whether the second closed path comprises at least one proximity section where the second closed path is close to a border of the first image area by:
      determining a distance between each respective image point on the second closed path and an image point on the border of the first image area that is closest to the respective image point on the second closed path;
      comparing the distance to a threshold value; and
      based on at least a predetermined number of the distances being less than the threshold value, determining that the second closed path comprises the at least one proximity section;
   based on the second closed path not comprising the at least one proximity section, determining a second image area of the image of the sample corresponding to an area of the displayed image enclosed by the second closed path; and
   based on the second closed path comprising the at least one proximity section, determining the at least one proximity section based on the image points on the second closed path for which the distances are less than the threshold value, determining the second image area corresponding to the area of the displayed image enclosed by the second closed path, and automatically adding at least one area of the displayed image between the border of the first image area and the at least one proximity section to the second image area.

13. A non-transitory computer-readable medium having processor-executable instructions stored thereon, wherein the processor-executable instructions, when executed by the one or more processors, facilitate performance of the method according claim 12.

* * * * *